US012297765B2

(12) United States Patent
Walters et al.

(10) Patent No.: US 12,297,765 B2
(45) Date of Patent: May 13, 2025

(54) ENGINE SYSTEM WITH COOLANT COLLECTOR

(71) Applicant: Caterpillar Inc., Peoria, IL (US)

(72) Inventors: Dean W. Walters, Rapid City, SD (US); Allen Y. Chen, Dunlap, IL (US); DeForest C. Gould, III, Washington, IL (US); Jason L Van Farowe, Brimfield, IL (US); Quinton M. Burcar, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 3 days.

(21) Appl. No.: 18/316,646

(22) Filed: May 12, 2023

(65) Prior Publication Data

US 2023/0279801 A1 Sep. 7, 2023

Related U.S. Application Data

(63) Continuation of application No. 17/891,492, filed on Aug. 19, 2022, now abandoned, which is a (Continued)

(51) Int. Cl.
*F01P 3/18* (2006.01)
*F01P 3/02* (2006.01)
(Continued)

(52) U.S. Cl.
CPC .................................... *F01P 3/18* (2013.01); *F01P 3/02* (2013.01); *F02F 1/10* (2013.01); *F02F 7/0021* (2013.01); *F02M 26/22* (2016.02)

(58) Field of Classification Search
CPC ........ F01P 3/18; F01P 3/02; F01P 3/12; F01P 11/04; F01P 2003/028; F01P 2060/16; (Continued)

(56) References Cited

U.S. PATENT DOCUMENTS 6,360,702 B1 * 3/2002 Osada .................. F28D 7/0066 123/41.31
7,516,737 B2 4/2009 Cerabone et al.
(Continued)

FOREIGN PATENT DOCUMENTS

CN 102953869 A 3/2013
CN 108317018 A 7/2018
(Continued)

OTHER PUBLICATIONS

Written Opinion and International Search Report for Int'l Patent Appln. No. PCT/US2021/058564 mailed Feb. 16, 2022 (13 pgs.).

*Primary Examiner* — Grant Moubry
(74) *Attorney, Agent, or Firm* — Bookoff McAndrews, PLLC

(57) ABSTRACT

An internal combustion engine system including a cylinder block, a cylinder head attached to the cylinder block, an EGR cooler, and a coolant collector bracket is provided. The cylinder head includes a plurality of coolant passages. The coolant collector bracket is coupled to and between the cylinder head and the EGR cooler. The coolant collector bracket includes a plurality of coolant inlets directly coupled to a plurality of outlets of the plurality of coolant passages of the cylinder head. The coolant collector bracket also includes an EGR coolant outlet directly coupled to an inlet of the EGR cooler. The coolant collector bracket also includes an EGR cooler inlet directly coupled to an outlet of the EGR cooler.

18 Claims, 12 Drawing Sheets

Related U.S. Application Data continuation of application No. 17/119,837, filed on Dec. 11, 2020, now Pat. No. 11,454,157.

(51) Int. Cl.
*F02F 1/10* (2006.01)
*F02F 7/00* (2006.01)
*F02M 26/22* (2016.01)

(58) Field of Classification Search
CPC .......... F02F 1/10; F02F 7/0021; F02M 26/22; F02M 26/23; F02M 26/32; F02M 26/30
See application file for complete search history.

(56) References Cited

U.S. PATENT DOCUMENTS

| | | | | |
|---|---|---|---|---|
| 9,238,988 | B2 | 1/2016 | Spooner et al. | |
| 9,303,595 | B2 * | 4/2016 | Forshier | F02M 26/30 |
| 10,151,279 | B2 | 12/2018 | Kim et al. | |
| 10,400,714 | B2 | 9/2019 | Rixon et al. | |
| 10,436,083 | B1 | 10/2019 | Au | |
| 10,626,833 | B2 * | 4/2020 | Uchibori | F02M 35/108 |
| 11,187,164 | B2 * | 11/2021 | Matsui | F02M 26/41 |
| 11,492,953 | B1 | 11/2022 | Chen et al. | |
| 11,739,717 | B2 * | 8/2023 | Toda | F02M 26/32 123/568.12 |
| 2006/0005791 | A1 | 1/2006 | Obidi | |
| 2008/0257317 | A1 | 10/2008 | Cerabone et al. | |
| 2010/0031644 | A1 | 2/2010 | Keane et al. | |
| 2014/0318511 | A1 | 10/2014 | Sekiya | |
| 2015/0102179 | A1 | 4/2015 | McHenry et al. | |
| 2017/0276095 | A1 * | 9/2017 | Beyer | F02M 26/30 |
| 2018/0087477 | A1 | 3/2018 | Kamoshida et al. | |
| 2019/0383245 | A1 | 12/2019 | Onodera | |
| 2020/0102916 | A1 * | 4/2020 | Suzuki | F02F 1/36 |
| 2022/0364532 | A1 | 11/2022 | Toda | |

FOREIGN PATENT DOCUMENTS

| | | | |
|---|---|---|---|
| JP | 2009203935 | A | 9/2009 |
| JP | 4659511 | B2 | 3/2011 |
| JP | 2012047154 | A | 3/2012 |
| KR | 19990030479 | U | 7/1999 |
| WO | 2018235736 | A1 | 12/2018 |

* cited by examiner

ENGINE SYSTEM WITH COOLANT COLLECTOR

CROSS-REFERENCE TO RELATED APPLICATION(S)

This patent application is a continuation of and claims the benefit of priority to U.S. Nonprovisional patent application Ser. No. 17/891,492, filed Aug. 19, 2022, which is a continuation of U.S. Nonprovisional patent application Ser. No. 17/119,837, filed on Dec. 11, 2020, now U.S. Pat. No. 11,454,157, issued on Sep. 27, 2022, all of which are incorporated herein by reference in their entireties.

TECHNICAL FIELD

This disclosure relates generally to an engine system, and more specifically, to an engine system having a coolant collector associated with an exhaust gas recirculation (EGR) cooler.

BACKGROUND

Internal combustion engines are typically liquid-cooled. A conventional coolant system for an internal combustion engine may include a coolant pump that pumps coolant into a coolant jacket of an engine block of the engine. The coolant then flows longitudinally through a portion of the coolant jacket surrounding the cylinders of the engine. The engine cylinders are cooled by the passing coolant through passages located in or adjacent the cylinder walls. The coolant may then flow into a water jacket of one or more cylinder heads to cool the components of the cylinder heads, such as injectors and valves, and then exits the engine. The coolant system may also include a number of other components, such as for example, a radiator, a thermostat, an exhaust gas recirculation (EGR) cooler, an aftercooler, and an oil cooler.

U.S. Pat. No. 7,516,737 ("the '737 patent") discloses an internal combustion engine with a cooling system and an exhaust gas recirculation (EGR) system. The EGR system includes an EGR heat exchanger or cooler with a coolant inlet opening connected to a coolant outlet opening of the engine for receiving coolant therefrom. The engine further includes a coolant collecting rail mounted to the engine and having a coolant inlet opening connected to the EGR heat exchanger, and at least one other coolant inlet opening in communication directly with at least one other coolant outlet opening of the engine. The cooling system of the '737 patent may have drawbacks both in one or more of manufacturing, assembly, cooling, and serviceability.

The system disclosed below may solve one or more of the problems set forth above and/or other problems in the art. The scope of the current disclosure, however, is defined by the attached claims, and not by the ability to solve any specific problem.

SUMMARY

In accordance with one aspect of the present disclosure, an internal combustion engine system including a cylinder block, a cylinder head attached to the cylinder block, an EGR cooler, and a coolant collector bracket is provided. The cylinder head includes a plurality of coolant passages. The coolant collector bracket is coupled to and between the cylinder head and the EGR cooler. The coolant collector bracket includes a plurality of coolant inlets directly coupled to a plurality of outlets of the plurality of coolant passages of the cylinder head. The coolant collector bracket also includes an EGR coolant outlet directly coupled to an inlet of the EGR cooler. The coolant collector bracket also includes an EGR coolant inlet directly coupled to an outlet of the EGR cooler.

In accordance with another aspect of the present disclosure, an internal combustion engine system including a cylinder block, a cylinder head, an EGR cooler, and a coolant collector bracket is provided. The cylinder head is vertically attached to the cylinder block and includes a plurality of coolant passages. The EGR cooler includes a plurality of mounting posts. The coolant collector bracket is directly coupled to and between the cylinder head and the EGR cooler. The coolant collector bracket is aligned to vertically support the EGR cooler. The coolant collector bracket includes a first internal channel for directly receiving coolant from a plurality of outlets of the plurality of coolant passages of the cylinder head. The coolant collector bracket also includes a second internal channel for directly communicating the coolant to the cylinder block. The coolant collector bracket is directly connected to the EGR cooler at the plurality of mounting posts.

In accordance with another aspect of the present disclosure, a method of directing coolant flow through an internal combustion engine system is provided. The internal combustion engine system includes a cylinder block, a cylinder head attached to the cylinder block, an EGR cooler, and a coolant collector bracket coupled to and between the cylinder head and the EGR cooler. The method includes directly supplying coolant through a plurality of outlets of a plurality of coolant passages of the cylinder head and into a plurality of coolant inlets of the coolant collector bracket. The method also includes moving the coolant through the plurality of coolant inlets and into a first internal coolant channel of the coolant collector bracket. The method also includes directing the coolant to flow upstream through an EGR coolant outlet of the coolant collector bracket and into an inlet of the EGR cooler. The method also includes enabling the coolant to flow downstream from an outlet of the EGR cooler and into a second internal coolant channel of the coolant collector bracket to supply the coolant to the cylinder block.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value.

Figure 1:
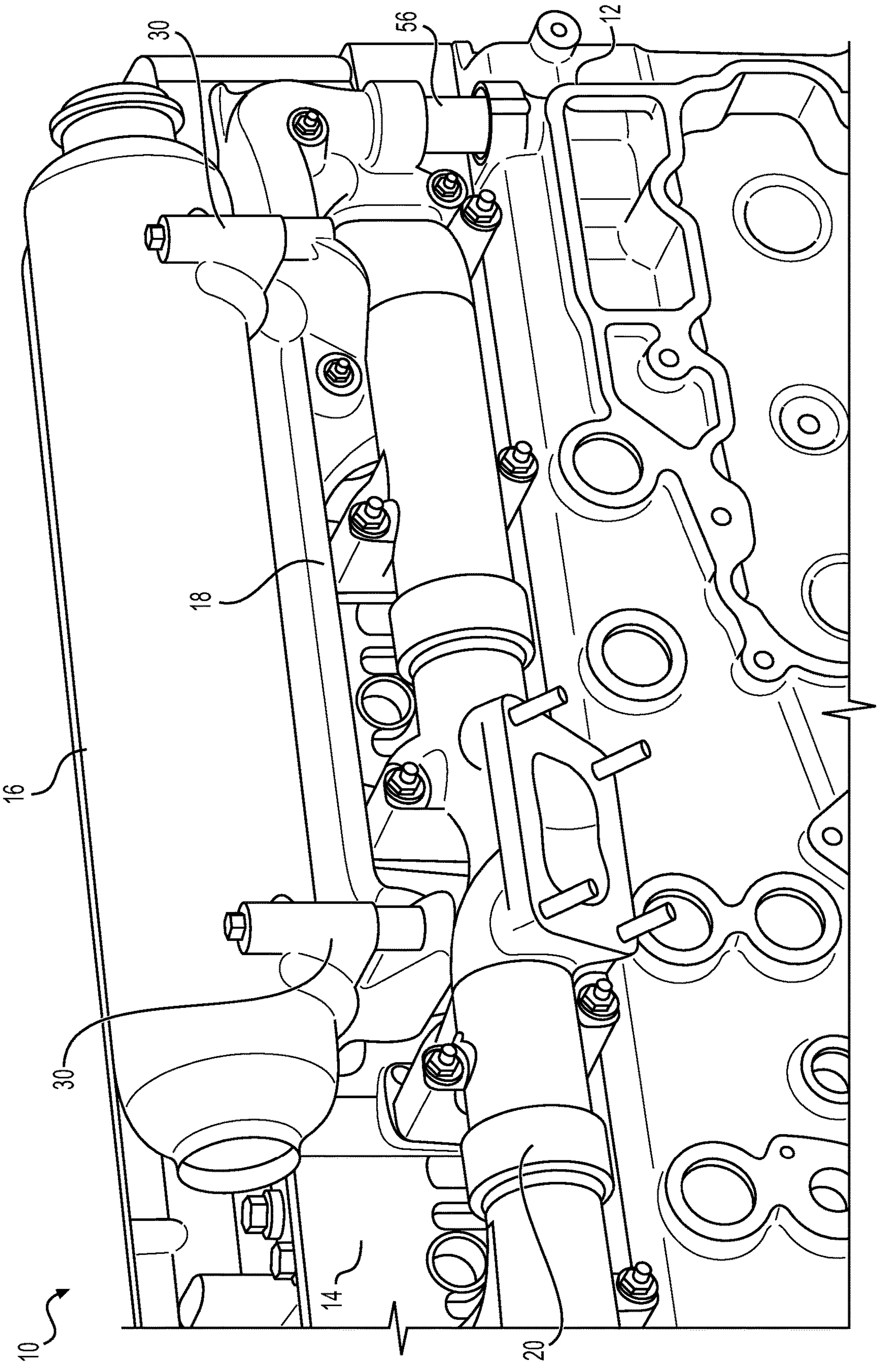
FIG. 1 is a front view of an exemplary embodiment of an engine system including an exhaust gas recirculation (EGR) cooler.
Figure 2:
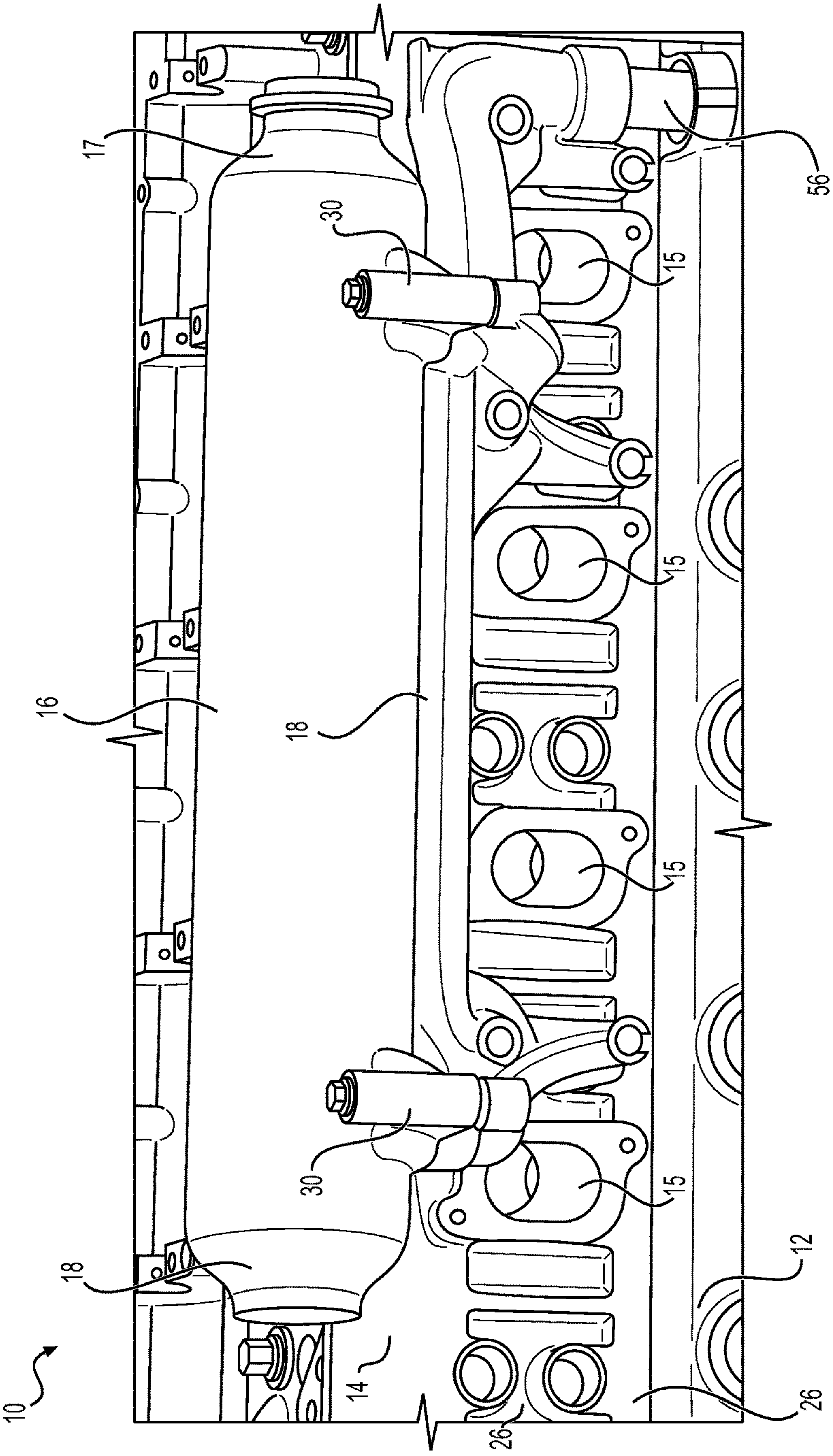
FIG. 2 is a front view of the engine system of FIG. 1 with the exhaust manifold being removed.

Referring to FIGS. 1-2, an exemplary embodiment of an internal combustion engine system 10, such as a diesel engine, is shown. The engine system 10 may provide power to various types of applications and/or machines. For example, the engine system 10 may power marine and military engines and/or a machine such as an off-highway truck, a railway locomotive, or an earth-moving machine, such as a wheel loader, excavator, dump truck, backhoe, motor grader, material handler, or the like. The term "machine" can also refer to stationary equipment like a generator that is driven by the engine system 10 to generate electricity.

As shown in FIG. 1, the engine system 10 includes a cylinder block 12, a cylinder head 14 attached to the top of cylinder block 12, an EGR cooler 16, a coolant collector bracket 18, and an exhaust manifold 20, as is known in the art. The cylinder block 12, cylinder head 14, EGR cooler 16, and exhaust manifold may be of any appropriate design, e.g. inline or V engine, any number of cylinders, and any fuel type—diesel, gasoline, and/or gaseous fuel. For ease of explanation, an inline, six cylinder diesel engine will be referenced hereinafter. FIG. 2 shows the engine system 10 with the exhaust manifold 20 removed, to better view the coolant collector bracket 18. With the exhaust manifold 20 removed, individual cylinder exhaust passages 15 can be seen. The cylinder block 12 and cylinder head 14 may further include a plurality of internal coolant passages or sumps (not shown) as part of a coolant circuit to cool the engine system 10. The coolant circuit can take any appropriate form, and may include, for example, a coolant sump, one or more coolant pumps, and a radiator or similar device (not shown).

The EGR cooler 16 forms a portion of the EGR flow path and includes a generally cylindrical-shaped heat exchanger having an EGR inlet end 17 and outlet end 19. EGR cooler 16 may be of any appropriate type, such as a parallel tube or parallel flow heat exchanger having a coolant inlet at one end, and a coolant exit at an opposite end. In some embodiments, EGR cooler 16 may have a rectangular, oval, and/or asymmetrical shape. As will be explained in more detail below, EGR cooler 16 may include a plurality of mounting posts 30 for connecting the EGR cooler 16 to a top portion of the coolant collector bracket 18. The EGR cooler 16 may include four mounting posts 30, only two of which can be seen in FIGS. 1 and 2.

Figure 3:
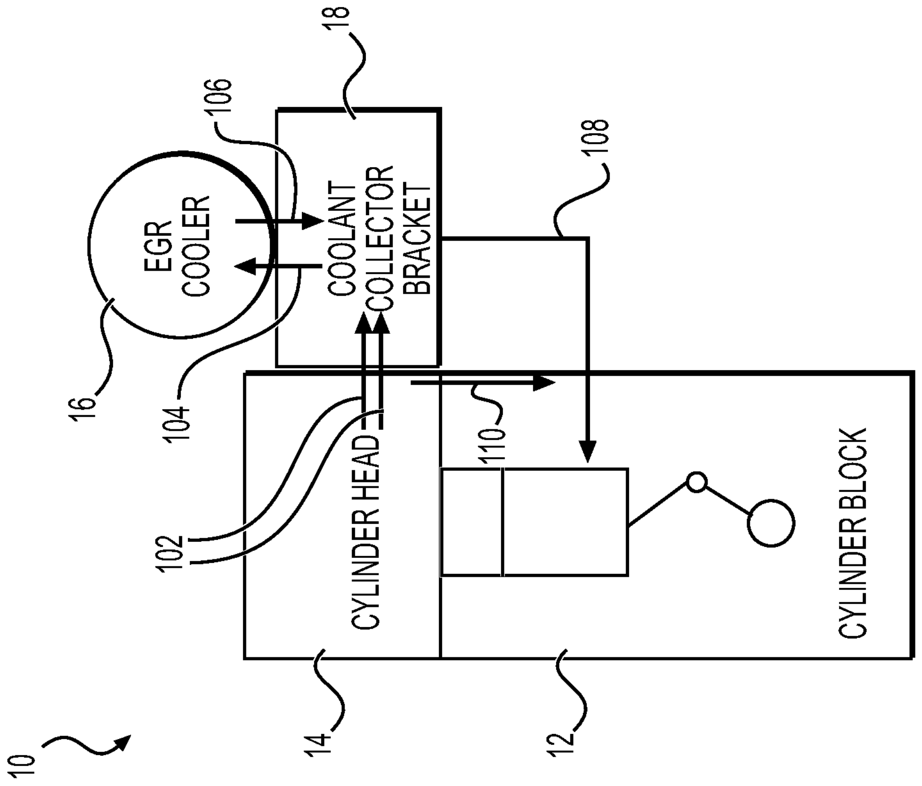
FIG. 3 is a schematic illustration of an exemplary flow path of coolant through the engine system of FIG. 1.

FIG. 3 schematically depicts an end view of engine system 10. As shown, coolant collector bracket 18 may be secured to a side of the cylinder head 14, and the EGR cooler 16 is secured to a top of the coolant collector bracket 18. FIG. 3 also depicts the coolant path through coolant collector bracket 18 and EGR cooler 16. For example, arrow 110 shows the flow of coolant from cylinder head 14 to cylinder block 12 to illustrate a top-down flow of coolant from cylinder head 14 to cylinder block 12; arrows 102 depict coolant flow from the cylinder head 14 to the coolant collector bracket 18; arrow 104 shows the coolant flow from the coolant collector bracket 18 to the EGR cooler; arrow 106 shows the coolant flow from the EGR cooler 16 back into the coolant collector bracket 18; and arrow 108 shows the coolant flowing from coolant collector bracket 18 back to cylinder block 12. In the exemplary embodiment, the coolant in coolant collector bracket 18 flows to a casted-in collector rail (not shown) in cylinder block 12. This collector rail is a cylinder block configured to receive coolant from coolant collector bracket 18.

Figure 4:
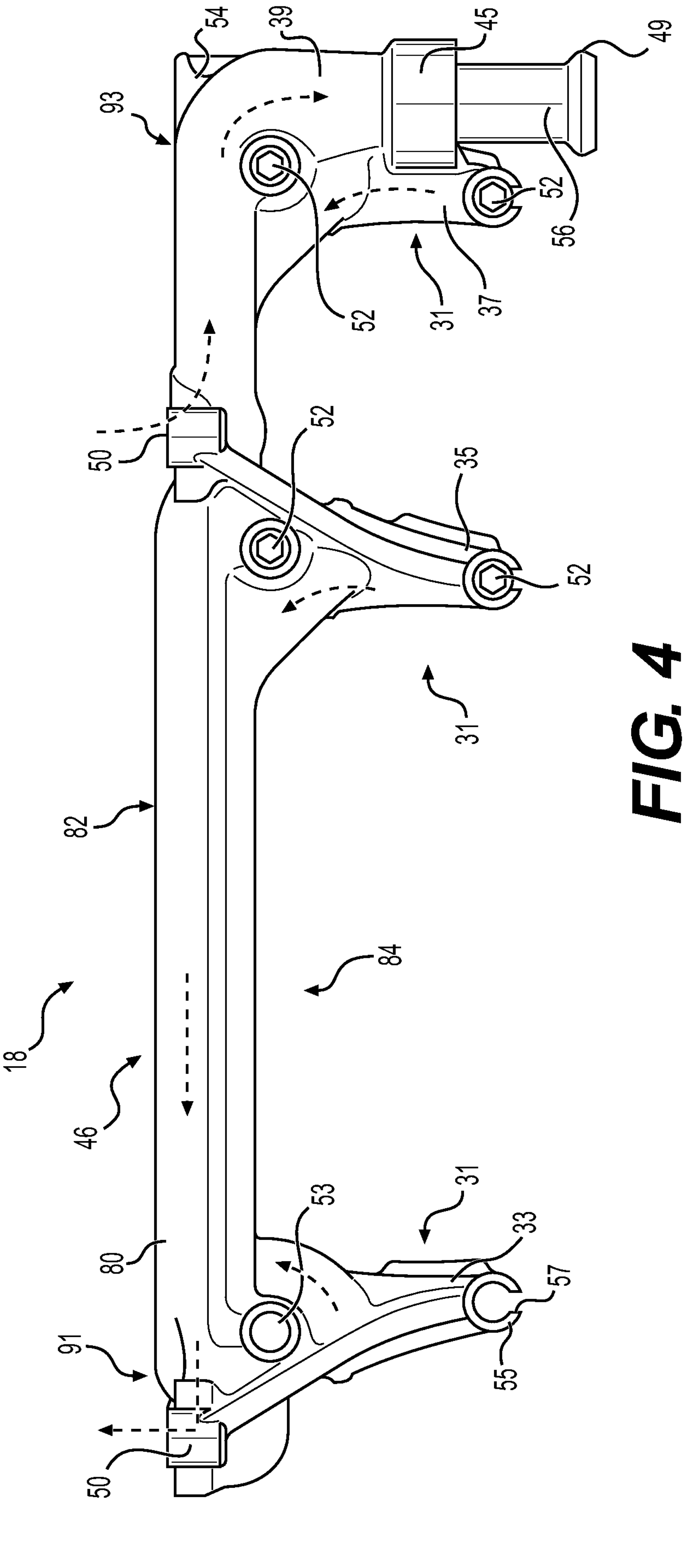
FIG. 4 is a front view of a coolant collector bracket of the engine system of FIG. 1.
Figure 5:
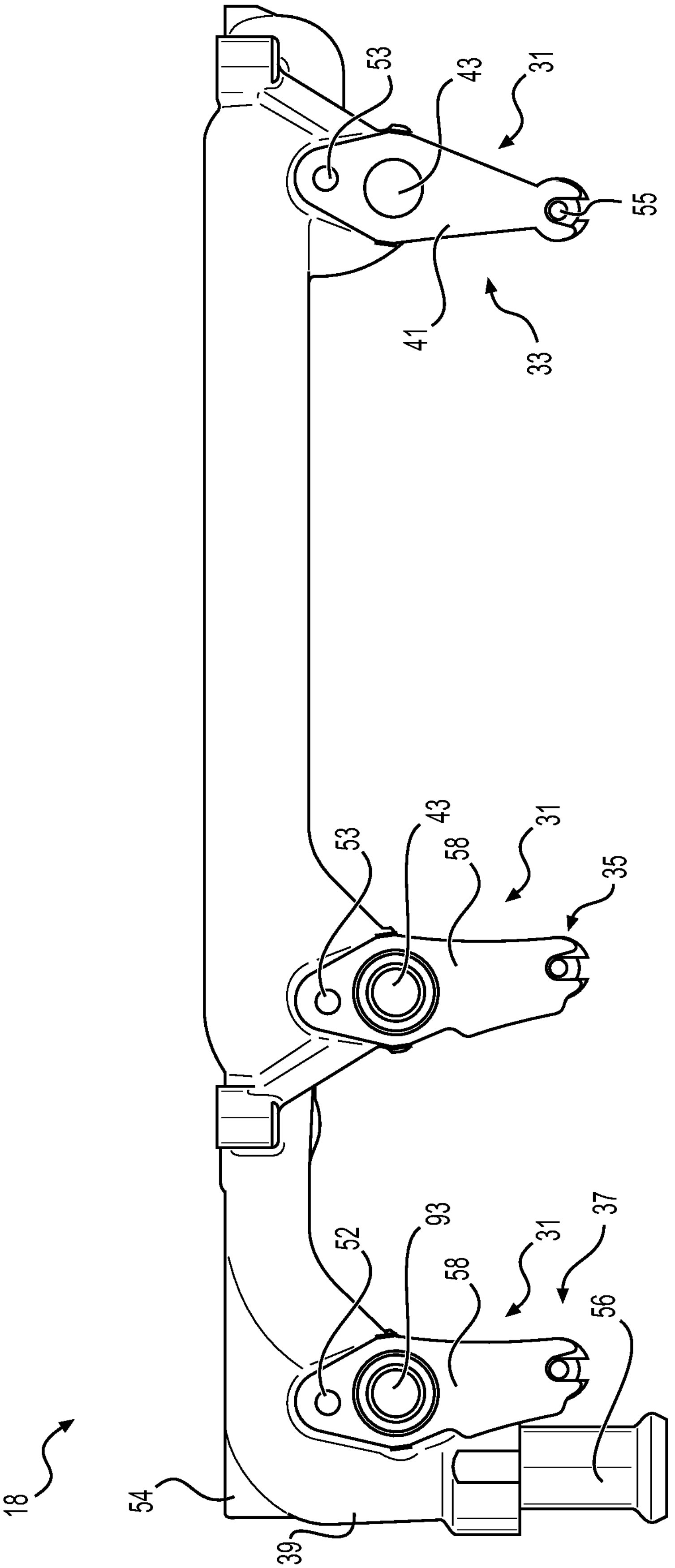
FIG. 5 is a rear view of the coolant collector bracket of FIG. 4.
Figure 6:
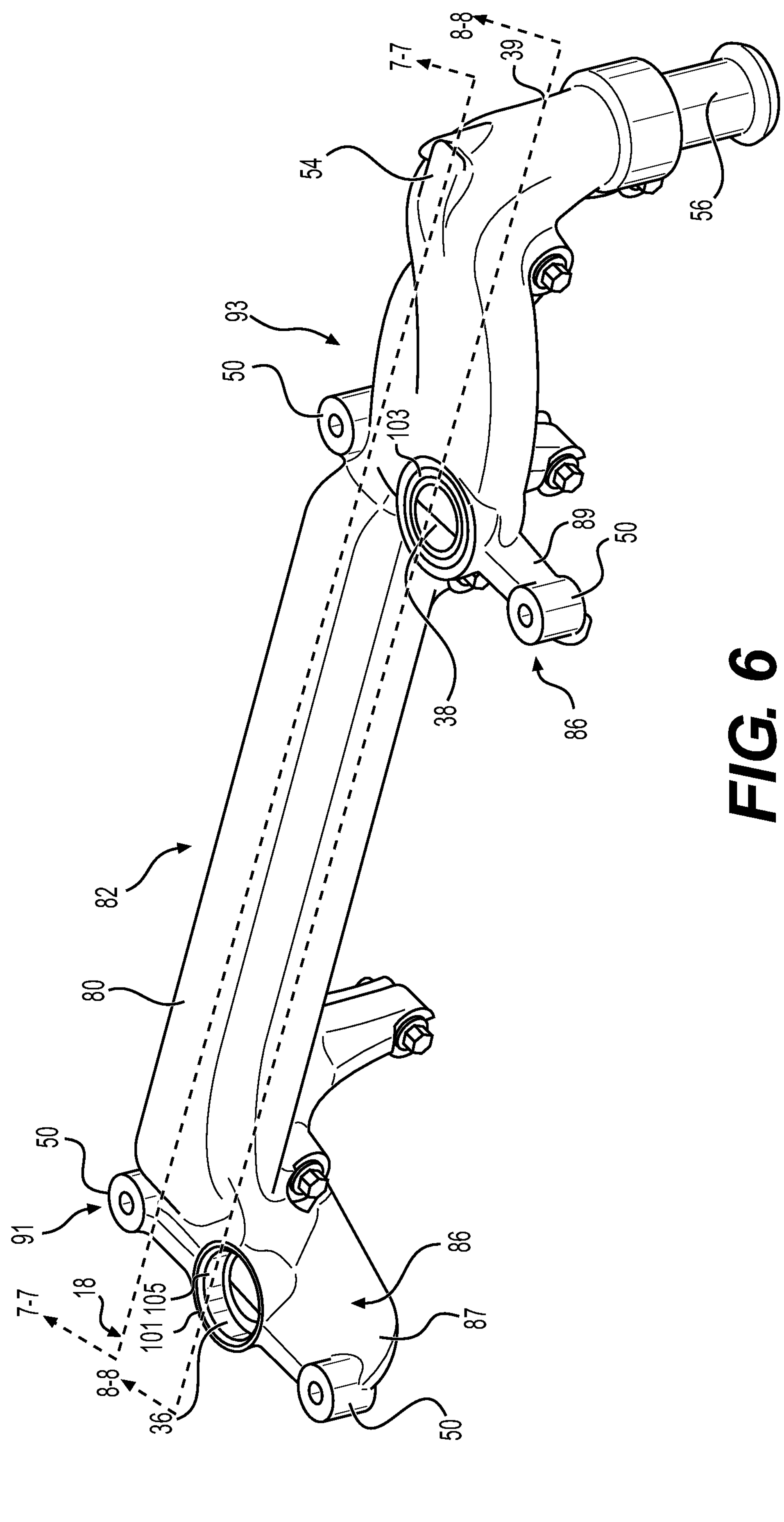
FIG. 6 is a top view of the coolant collector bracket of FIG. 4.

FIGS. 4-8 depict the coolant collector bracket 18 alone, removed from the engine system 10. Referring to FIG. 4, coolant collector bracket 18 includes a longitudinally extending body portion 80, a plurality of mounting members or mounting legs 31, and an exit leg (e.g., an arm) 39. Body portion 80 is mounted to cylinder head 14 to be orientated generally horizontal and includes a longitudinal length approximately the same as the longitudinal length of EGR cooler 16. Body portion 80 may include a top portion 82 on which the EGR cooler 16 may be directly secured, and a bottom portion 84 from which mounting legs 31 extend. Referring to FIG. 6, the top portion 82 of coolant collector bracket 18 is generally planar and may include a pair of EGR cooler mounts 86, an EGR coolant outlet 36, and an EGR coolant inlet 38. Each mount 86 may be similarly configured and one mount 87 may be located at a front end portion 91 of the coolant collector bracket 18, and the other mount 89 may be located at a rear end portion 93 of the coolant collector bracket 18, but not as rear as the exit leg 39. The mounts 86 may each extend from the front and rear sides of the body portion 80 generally normal to the longitudinal length of the body portion 80. Mounts 86 may each protrude from sides of the body portion 80 to form a widest extent of the coolant collector bracket 18. Mounts 86 may further include a pair of fastener connectors 50 (e.g. threaded or non-threaded bolt receiving holes) at the longitudinal ends of the mounts 86, and such fastener connectors 50 may be located to align and mate with the mounting posts 30 of the EGR cooler 16 (FIG. 1). Mounting posts 30 allow for the use of standard coolant face seal(s) and provides a more robust attachment between EGR cooler 16 and coolant collector bracket 18.

EGR coolant outlet 36 may be located along the longitudinal axis of front mount 87, and generally centrally positioned between the fastener connectors 50 of front mount 87. EGR coolant inlet 38 of coolant collector bracket 18 may similarly be located along the longitudinal axis of rear mount 89, and generally centrally positioned between the fastener connectors 50 of the rear mount 89. Further, EGR coolant outlet 36 and EGR coolant inlet 38 generally align with each other along the longitudinal direction of the body portion 80. EGR coolant outlet 36 and EGR coolant inlet 38 are also located to align with a coolant inlet and coolant outlet, respectively, of EGR cooler 16 (not shown).

Appropriate fluid sealing systems may be provided at one or both of EGR coolant outlet 36 and EGR coolant inlet 38 of coolant collector bracket 18 to sealingly connect to the coolant inlet and exit of the EGR cooler 16. For example, EGR coolant outlet 36 and EGR coolant inlet 38 may include O-ring and/or other appropriate seals. In one arrangement, such as that shown in FIG. 6, the seals may be different between the EGR coolant outlet 36 and EGR coolant inlet 38, such as a radial O-ring seal at EGR coolant outlet 36, and a face seal 103 at EGR coolant inlet 38. Such different seals may facilitate possible misalignment between flow connections between the EGR cooler 16 and the coolant collector bracket 18. Further, the coolant inlet of the EGR cooler 16 may include a short tube configured to be inserted into a recess 105 formed in EGR coolant outlet 36 of the coolant collector bracket 18, and such a short tube may be omitted from the coolant outlet of the EGR cooler 16.

As best shown in FIGS. 4 and 5, coolant collector bracket 18 may include three mounting legs 31. For example, coolant collector bracket 18 may include a front mounting leg 33, a middle mounting leg 35, and a rear mounting leg 37. The middle mounting leg 35 may be positioned closer to the rear end portion 93 of the coolant collector bracket 18 such that a distance or gap between the front mounting leg 33 and the middle mounting leg 35 is greater than a distance or gap between the middle mounting leg 35 and the rear mounting leg 37. Further, rear mounting leg 37 may be located forward of exit leg 39. It is understood that coolant collector bracket 18 may include more or less mounting legs 31, and the mounting legs 31 may be located at different positions than depicted in the figures.

Mounting legs 31 may each include a plurality of fastener connectors for connecting the coolant collector bracket 18 to the cylinder head 14. The fastener connectors may be similarly arranged on each of the mounting legs 31. Referring to FIG. 4 and front mounting leg 33, the fastener connectors may include a top fastener connector 53, and a bottom fastener connector 55. The top fastener connector 53 may be located adjacent a junction or transition between body portion 80 and front mounting leg 33. Top fastener connector 53 may include a generally round, threaded or non-threaded opening extending transversely through front mounting leg 33 from a front surface to a back surface of thereof. It is understood that the top fastener connector 53 may take different shapes than round. Bottom fastener connector 55 may be located at a distal-most end of the front mounting leg 33, and may include a round opening that includes a bottom gap or slot 57 extending the opening through a bottom most surface of front mounting leg 33. With such a bottom slot 57, bottom fastener connector 55 may form a generally C-shape. As will be discussed in more detail below, bottom fastener connector 55 (and corresponding bottom fastener connectors of the other mounting legs 31) facilitates mounting the coolant collector bracket 18 to cylinder head 14. Both top and bottom fastener connectors 53 and 55 are sized and configured for receiving appropriate fasteners, such as cylinder head fasteners (e.g., cylinder head bolts) 52 (included in middle and rear mounting legs 35 and 37 in FIGS. 4 and 5. As noted above, each of the mounting legs 31 may be provided with the same mounting connector arrangement as front mounting leg 33 discussed above. However, it is understood that different arrangements are contemplated for front mounting leg 33 or any of the other mounting legs 31.

Figure 13:
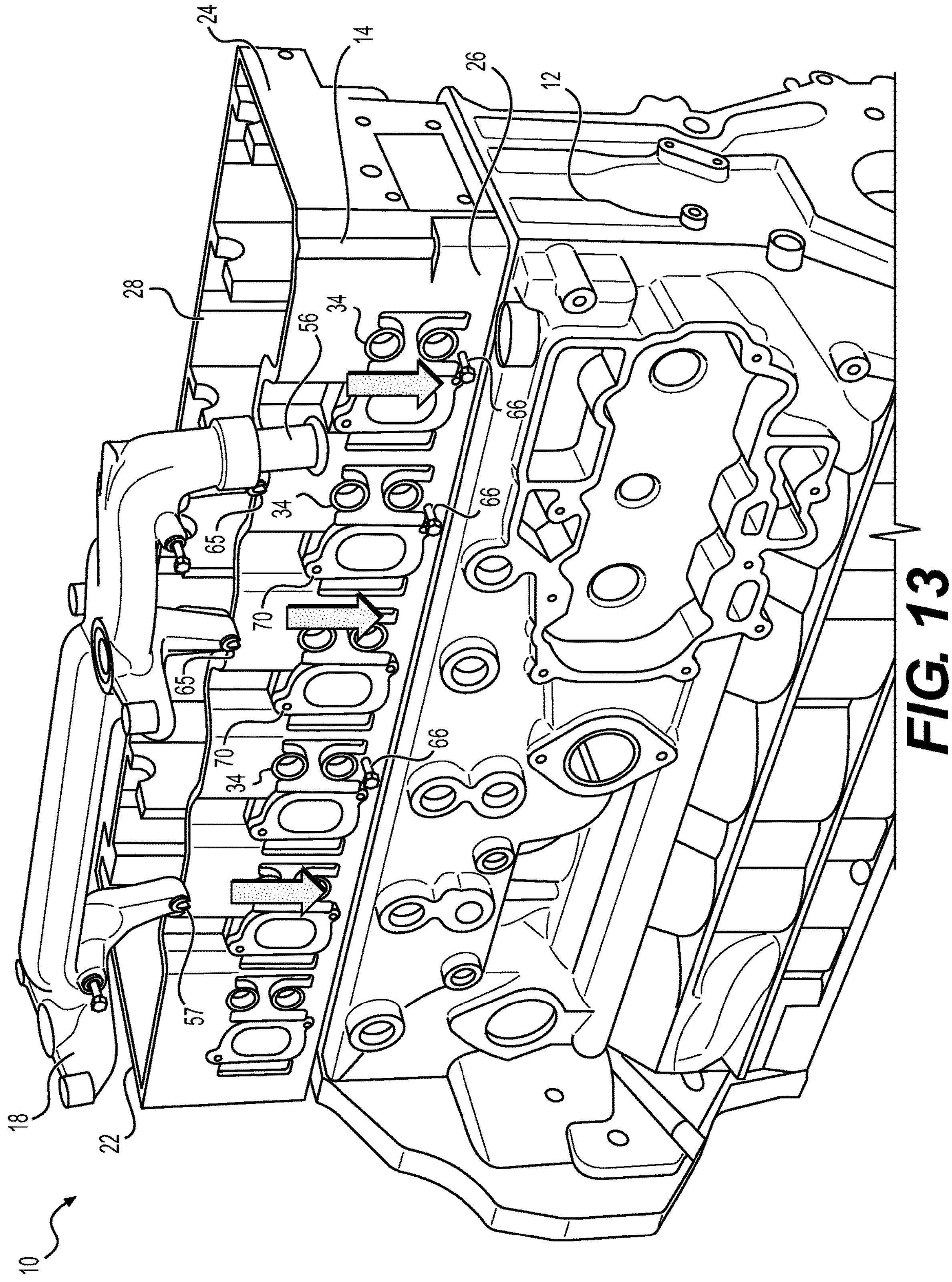
FIG. 13 is a partial exploded view illustrating assembly of the engine system of FIG. 1.

Referring to FIG. 5 and front mounting leg 33, the back side of mounting legs 31 may be generally similarly arranged and include a generally planar mounting surface 41, and a coolant inlet 43. The mounting surfaces 41 of each of the mounting legs 31 are generally coplanar and form the back-most extent of coolant collector bracket 18. Coolant inlets 43 may be located between top and bottom fastener connectors 53 and 55, generally above a longitudinal mid-point of mounting legs 31. Coolant inlets 43 are located to align with coolant outlets 34 of the cylinder head 14 (FIG. 13). The distance between each coolant inlet 43 may be substantially different based on the position of and distance between mounting legs 31. As shown in FIG. 5, the distance between coolant inlet 43 of front mounting leg 33 and coolant inlet 43 of each of the other mounting legs 31 may be different.

Figure 11:
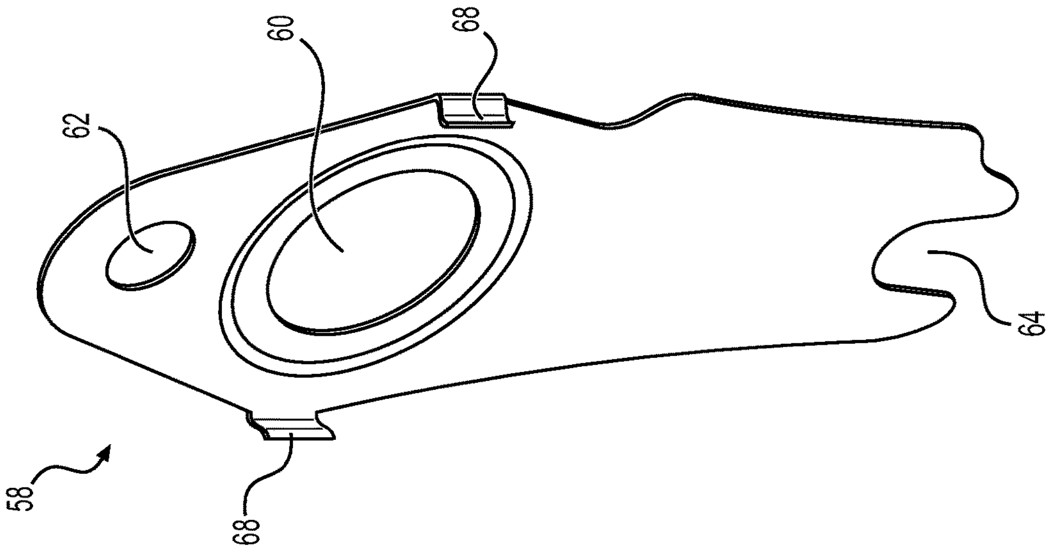
FIG. 11 is a rear (engine side) view of the gasket of FIG. 10.
Figure 10:
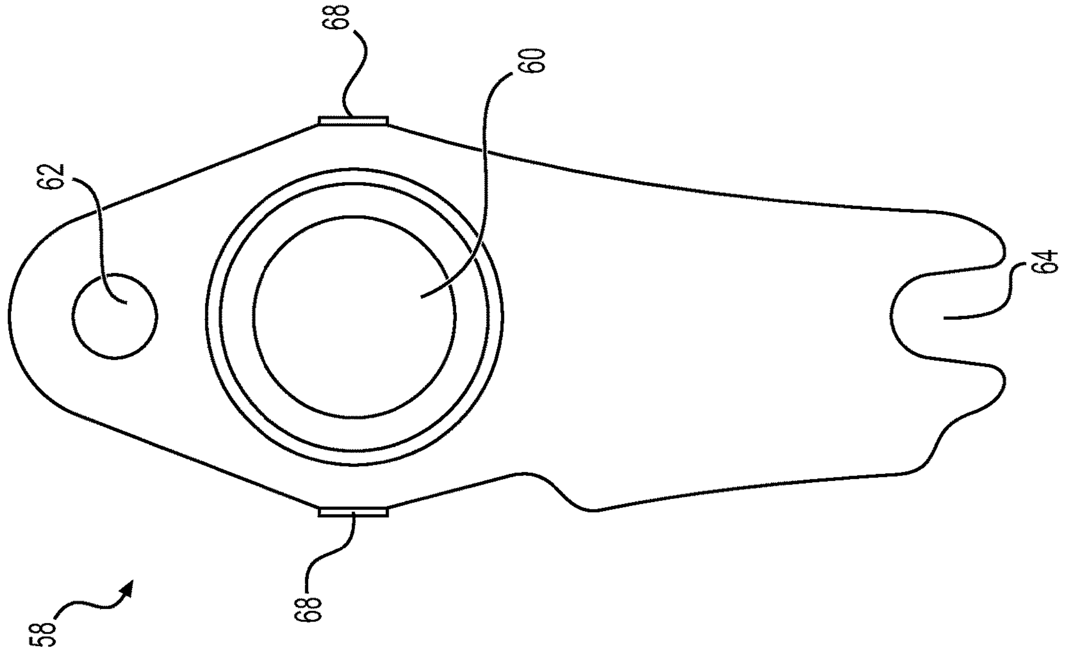
FIG. 10 is a front (bracket side) view of a gasket of the coolant collector bracket of FIG. 4.
Figure 12:
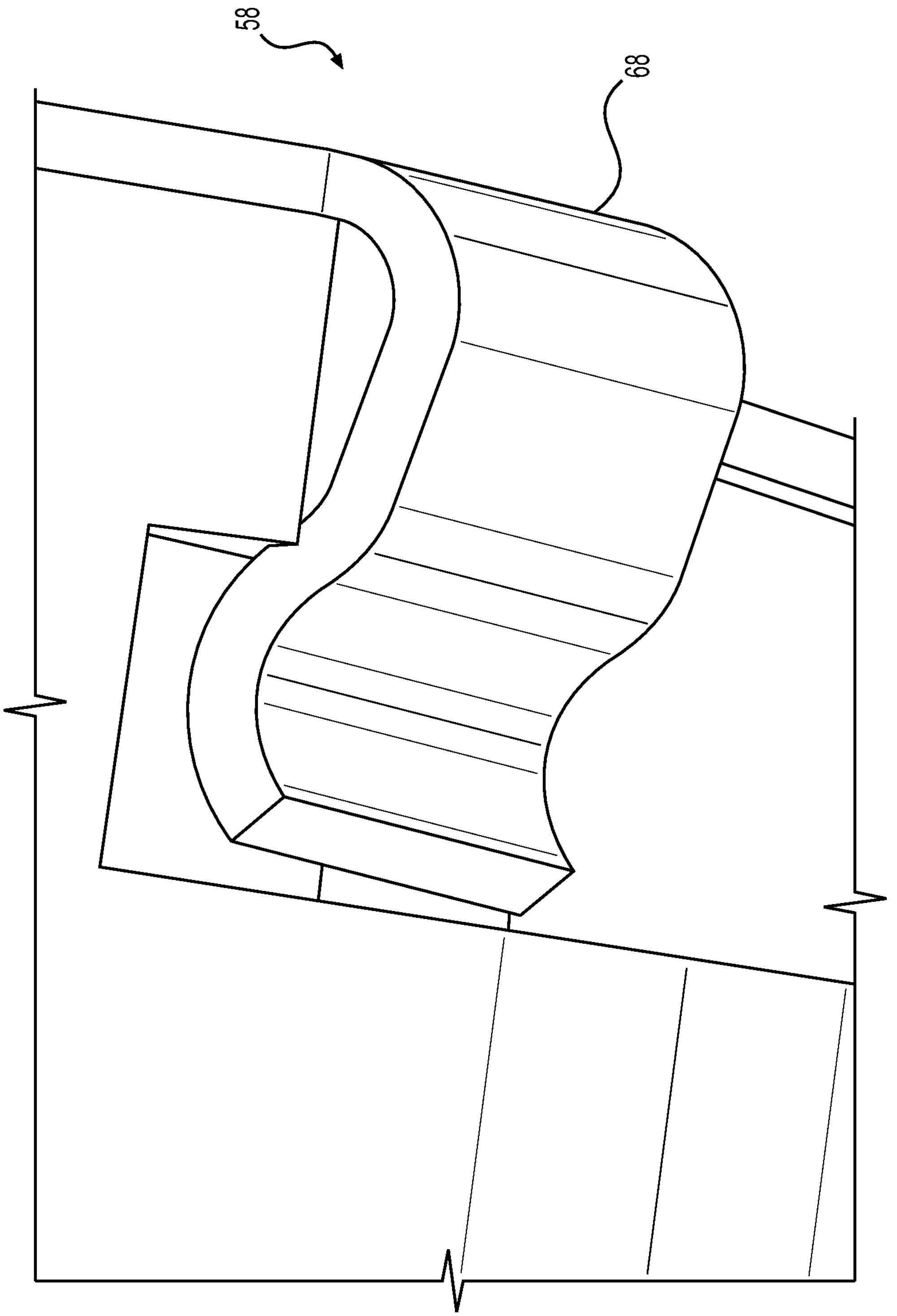
FIG. 12 is a bottom view of the gasket of FIG. 10.

FIG. 5 shows middle mounting leg 35 and rear mounting leg 37 with a gasket 58 mounted to the planar mounting surface 41 of the mounting legs 31. The particulars of the mounting gaskets 58 are further shown in FIGS. 10-12. In particular, FIG. 10 illustrates a front view and FIG. 11 illustrates a rear view of a gasket 58. As shown in FIG. 5, gaskets 58 are securely fastened to the mounting legs 31 of the coolant collector bracket 18. As shown in FIG. 12, each gasket 58 is sized and shaped to snap onto a surface of a corresponding mounting leg 31. The gaskets 58 are configured to directly couple to the first side 26 of the cylinder head 14. As shown in FIGS. 10 and 11, each gasket 58 includes an inlet opening 60 corresponding to a respective coolant inlet 43 (FIG. 5).

As shown in FIGS. 10-12, each gasket 58 includes a pair of flanges 68 that extend laterally to engage surface edges of a corresponding mounting leg 31. In the exemplary embodiment, the gaskets 58 are of a metal material. As shown in FIG. 13, the cylinder head 14 includes a plurality of bottom fasteners 66 (e.g., bolts) positioned along a bottom edge of the first side 26. The cylinder head 14 also includes a plurality of bracket connection openings 70 configured to receive the cylinder head fasteners 52 associated with corresponding mounting legs 31.

Figure 9:
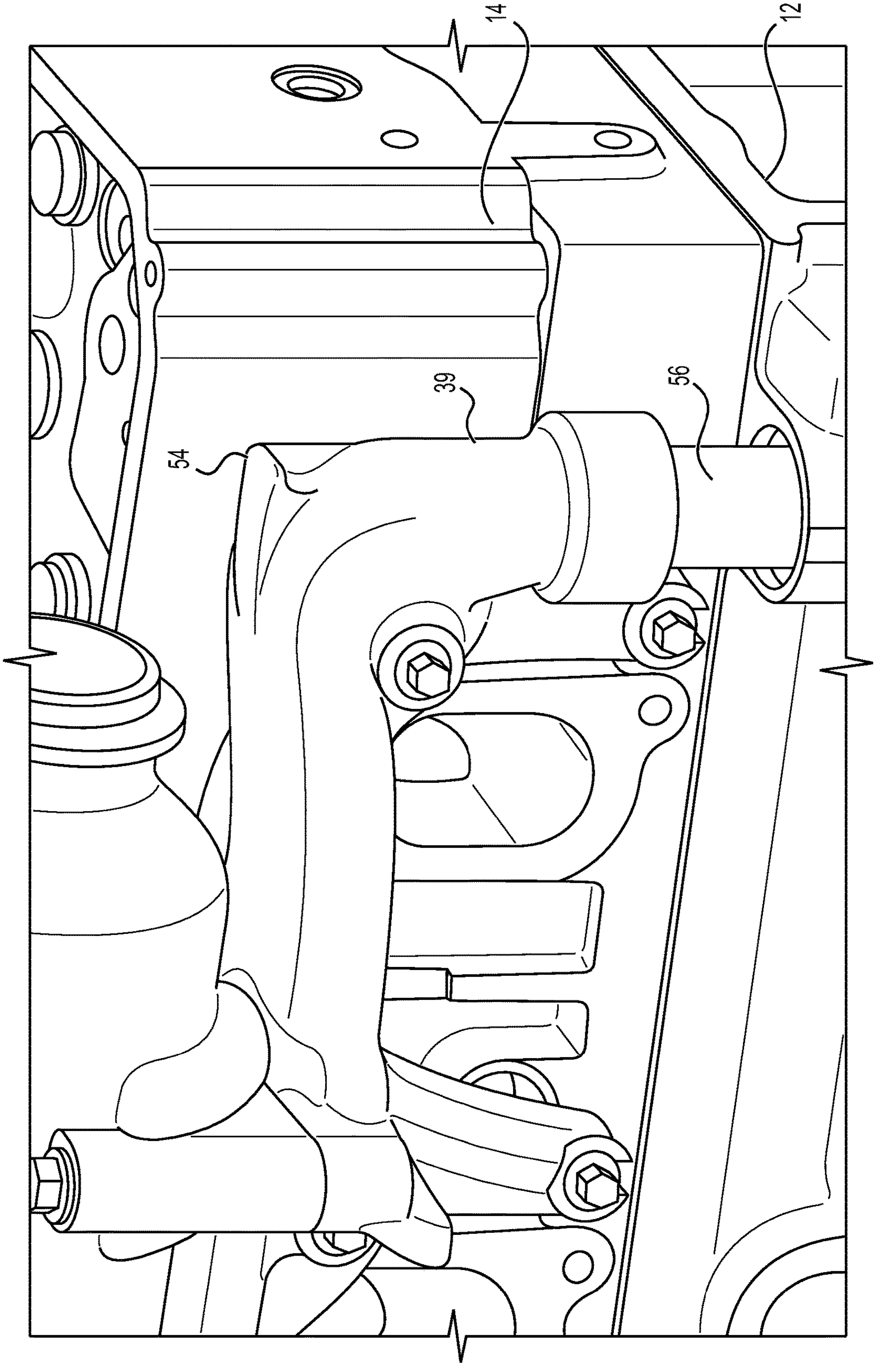
FIG. 9 is a partial perspective view of the coolant collector bracket and a jumper tube of the engine system of FIG. 1.

Referring back to FIGS. 4-6, exit leg (e.g., arm) 39 forms a generally L-shape extending from the rear end portion 93 of coolant collector bracket 18. The exit leg 39 includes a protrusion forming a seat (e.g., a flap) 54 that extends upwards from the exit leg 39 such that the seat 54 laterally protrudes from the top side 48. The exit leg 39 includes a distal end 45 that is coupled to a jumper tube 56. The distal end 45 of exit leg 39 extends generally orthogonally from the body portion 80 and seat 54 is vertically aligned with the jumper tube 56. In the illustrated embodiment, the jumper tube 56 includes an O-ring seal member 49. FIG. 9 shows the connection between the coolant collector bracket 18 and the cylinder block 12. Specifically, during assembly of the engine system 10, the jumper tube 56, which connects the coolant collector bracket 18 to the cylinder block 12, provides flexibility to allow for angular misalignment between the coolant collector bracket 18 and the cylinder block 12.

Figure 7:
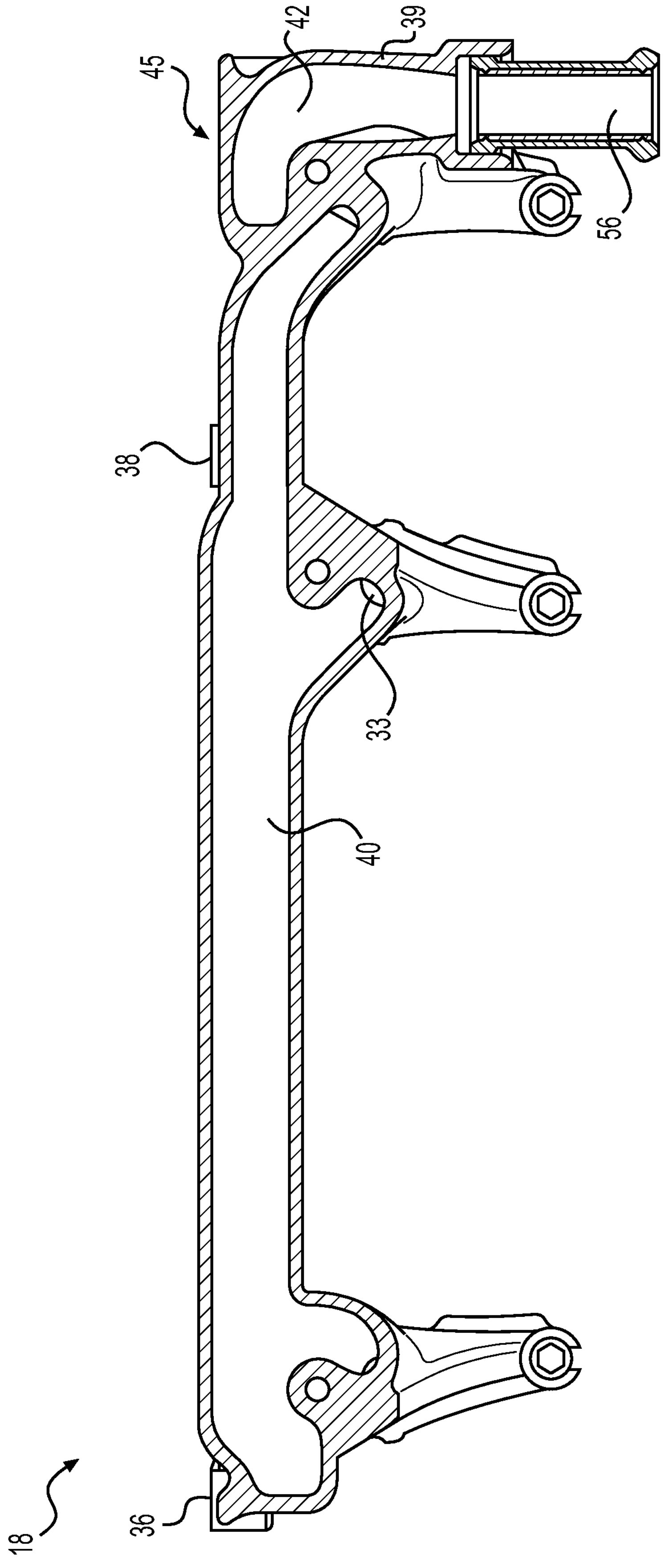
FIG. 7 is a section view of the coolant collector bracket of FIG. 4.
Figure 8:
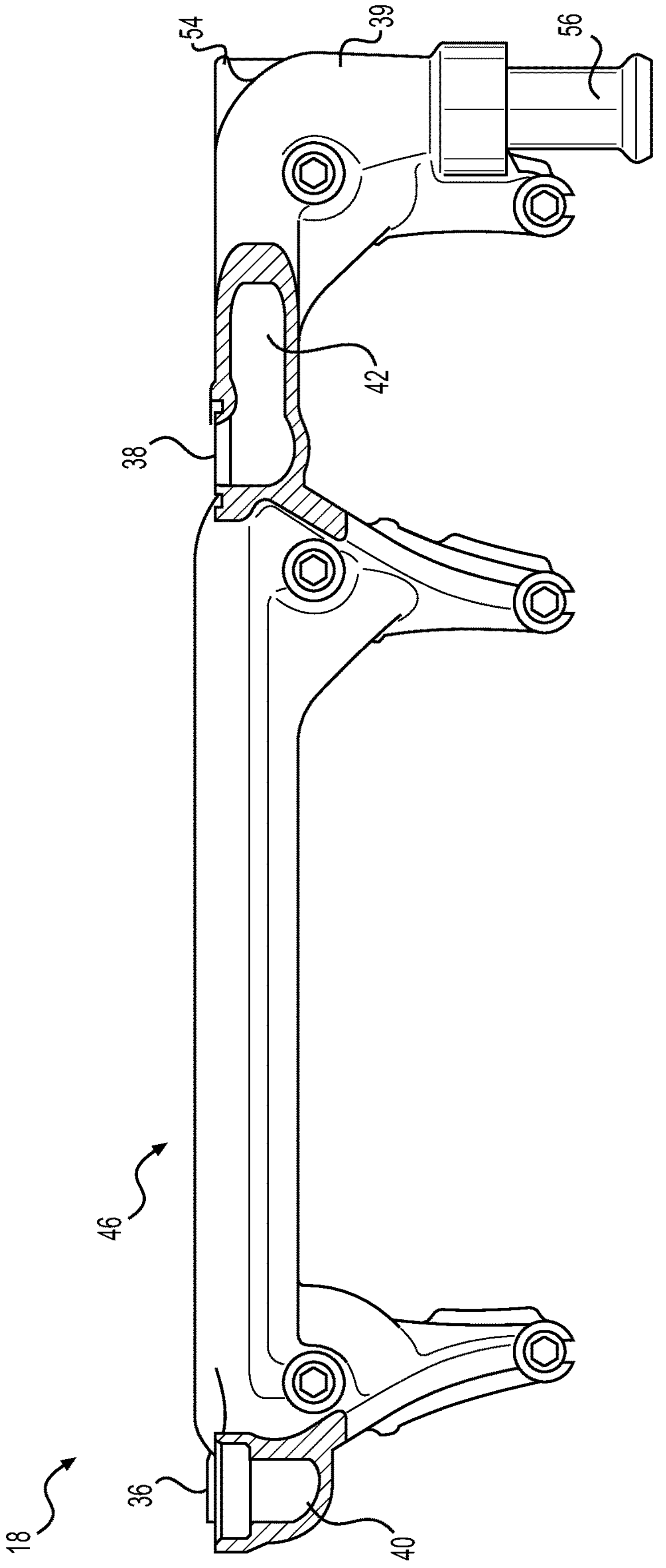
FIG. 8 is a partial section view of internal channels of the coolant collector bracket of FIG. 4.

Coolant collector bracket 18 includes a plurality of internal flow passages or conduits. The dashed arrows of FIG. 4 depict the flow of coolant through coolant collector bracket 18. In particular, as shown in FIG. 4, distal end 45 of exit leg 39 is fluidly coupled to the EGR coolant inlet 38 of coolant collector bracket 18. Further, FIGS. 7 and 8 provide longitudinal cross-sections of the coolant collector bracket 18 showing the internal flow passages or conduits of coolant collector bracket. As show, the coolant collector bracket 18 includes two separate internal coolant channels 40, 42. The EGR cooler 16 (FIG. 1) is in fluid communication with the two separate internal coolant channels 40, 42. The first internal coolant channel 40 is in fluid communication with the coolant passages of the cylinder head 14. In particular, the first internal coolant channel 40 directly receives coolant from the outlets 34 of the coolant passages of the cylinder head 14 and sends the coolant to the EGR cooler 16. The second internal coolant channel 42 is in fluid communication with the cylinder block 12. In particular, the second internal coolant channel 42 directs coolant received from the EGR cooler 16 into the cylinder block 12. As such, the plurality of fastener connectors 50 are laterally offset with respect to the internal coolant channels 40, 42 within the coolant collector bracket.

INDUSTRIAL APPLICABILITY

The disclosed features and systems may be used in any appropriate engine system having a liquid cooling system, and may facilitate coolant flow within such engine systems.

Referring back to FIGS. 1 and 2, the coolant collector bracket 18 is mounted to a generally perpendicular surface of the cylinder head 14. In particular, as best shown in FIG. 13, the cylinder head 14 includes a first end 22, a second end 24 opposite the first end 22, a first side 26 extending between the first end 22 and the second end 24, and a second side 28 opposite the first side 26 and extending between the first end 22 and the second end 24. The first side 26 and the second side 28 of the cylinder head 14 each have a length that is substantially longer than a corresponding length of the first end 22 and the second end 24. In the illustrated embodiment, the coolant collector bracket 18 is positioned generally parallel to the first side 26 of the cylinder head 14 and generally orthogonal to EGR cooler 16 (FIG. 2). As shown in FIGS. 1 and 2, and schematically shown in FIG. 3, the coolant collector bracket 18 is coupled to and between the cylinder head 14 and the EGR cooler 16. The coolant collector bracket 18 vertically supports the EGR cooler 16. The coolant collector bracket 18 has a generally parallel and vertical mounting interface with cylinder head 14, and a generally parallel and horizontal mounting interface with EGR cooler 16. As shown in FIG. 1, when the exhaust manifold 20 is coupled to the cylinder head 14, the mounting legs 31 of the coolant collector bracket 18 are located between the exhaust manifold 20 and the cylinder head 14.

Referring to FIG. 13, during assembly, the coolant collector bracket 18 is positioned near the first side 26 of the cylinder head 14 such that slots 57 of the mounting legs 31 are slidably inserted onto the bottom fasteners 66 of the cylinder head 14. This assembly process allows the coolant collector bracket 18 to be easily secured to the cylinder head 14, and the weight of the coolant collector bracket 18 to be supported by cylinder head fasteners 52.

After positioning the coolant collector bracket 18 near the cylinder head 14, force is vertically applied onto the seat 54 to securely couple the jumper tube 56 of the coolant collector bracket 18 to the cylinder block 12. For example, a hammer may be used to apply force to the seat 54 to secure the jumper tube 56 to the cylinder block 12. The jumper tube 56 assists in the alignment of the distal end 45 of the exit leg. After securing the jumper tube 56 to the cylinder block 12, the cylinder head fasteners 52 associated with the top fastener connector 53 of the mounting legs 31 can be received by the bracket connection openings 70 of the cylinder head 14 to securely fasten the coolant collector bracket 18 to the cylinder head 14.

Thus, the coolant collector bracket 18 described herein provides a number of features for facilitating assembly to the engine system 10. For example, the jumper tube 56 of the coolant collector bracket 18 facilitates alignment of the distal end 45 of the exit leg 39. The slots 65 (and corresponding slot openings 64) as described above, allow for the coolant collector bracket 18 to be slidably inserted onto the corresponding bottom fasteners 66 of the cylinder head 14. Further, the gaskets 58 of the coolant collector bracket 18 facilitate assembly by securely snapping in place on the mounting legs 31. Additionally, the vertical orientation of the EGR cooler 16 coupling to the coolant collector bracket 18 allows for the EGR cooler 16 to rest on top of the coolant collector bracket 18 during coupling. Specifically, as opposed to horizontally mounting the coolant collector bracket 18 from the side (which would require holding the EGR cooler 16 during coupling), the vertical orientation of the fastener connectors 50 of mounts 86 (FIG. 6) allows for ease of vertical assembly since the EGR cooler 16 need only be placed on the top side 48 of the coolant collector bracket 18. Thus, the features described herein facilitate the vertical assembly of the coolant collector bracket 18 to the engine system 10.

While the present disclosure has been illustrated by the description of embodiments thereof, and while the embodiments have been described in considerable detail, it is not the intention of the applicant to restrict or in any way limit the scope of the claims to such detail. Additional advantages and modifications will readily appear to those skilled in the art. Therefore, the present disclosure, in its broader aspects, is not limited to the specific details, the representative compositions or formulations, and illustrative examples shown and described. Accordingly, departures may be made from such details without departing from the spirit or scope of Applicant's general disclosure herein.

What is claimed is:

1. A coolant collector bracket, comprising:

a longitudinally extending body portion having a plurality of internal coolant channels;

a first side;

a second side opposite the first side, the second side including a plurality of coolant inlets for receiving coolant from a cylinder head; and a top side including:

an exhaust gas recirculation (EGR) coolant inlet;

an EGR coolant outlet; and a plurality of fastener connectors, including a fastener connector laterally offset with respect to the plurality of internal coolant channels within the coolant collector bracket, wherein the top side is fixed relative to an EGR cooler at the plurality of fastener connectors.

2. The coolant collector bracket of claim 1, wherein the plurality of fastener connectors are vertically oriented so as to face upward away from the top side.

3. The coolant collector bracket of claim 1, wherein a first fastener connector of the plurality of fastener connectors is adjacent the EGR coolant inlet and a second fastener connector of the plurality of fastener connectors is adjacent the EGR coolant outlet.

4. The coolant collector bracket of claim 3, wherein a first length from the first fastener connector to the second fastener connector is greater than: (i) a second length from the EGR coolant inlet to the first fastener connector, and (ii) a third length from the EGR coolant outlet to the second fastener connector.

5. The coolant collector bracket of claim 1, further comprising a downward-facing exit leg configured to deliver coolant to a cylinder block.

6. The coolant collector bracket of claim 1, further comprising a first side fastener connector disposed adjacent the first side.

7. An internal combustion engine system, comprising:

an exhaust gas recirculation (EGR) cooler; and a coolant collector bracket configured to be coupled to the EGR cooler by a plurality of fasteners, the coolant collector bracket positioned underneath the EGR cooler and vertically supporting the EGR cooler, the coolant collector bracket including:

a plurality of coolant inlets for receiving coolant from a cylinder head;

a plurality of fastener connectors configured to receive the plurality of fasteners;

an EGR coolant outlet coupled to an inlet of the EGR cooler; and an EGR coolant inlet coupled to an outlet of the EGR cooler, wherein the EGR coolant inlet and the EGR coolant outlet are substantially orthogonal to the plurality of coolant inlets.

8. The internal combustion engine system of claim 7, wherein the plurality of coolant inlets are in fluid communication with the EGR coolant outlet of the coolant collector bracket.

9. The internal combustion engine system of claim 8, wherein the coolant collector bracket further includes an exit leg formed at an end portion of the coolant collector bracket, the exit leg being configured to guide the coolant in a direction that is generally orthogonal to the plurality of coolant inlets, the EGR coolant inlet, and the EGR coolant outlet.

10. The internal combustion engine system of claim 7, wherein the coolant collector bracket further includes an internal coolant channel configured to guide the coolant in a direction that is generally orthogonal to the plurality of coolant inlets, the EGR coolant inlet, and the EGR coolant outlet.

11. The internal combustion engine system of claim 7, further comprising an exhaust manifold coupled to the cylinder head, and wherein a portion of the coolant collector bracket is located between the exhaust manifold and the cylinder head.

12. The internal combustion engine system of claim 7, wherein the plurality of coolant inlets includes a first coolant inlet, a second coolant inlet, and a third coolant inlet, a distance between the first and second coolant inlets being substantially different than a distance between the second and third coolant inlets.

13. The internal combustion engine system of claim 7, wherein the EGR coolant outlet and the EGR coolant inlet are connected to separate internal coolant channels within the coolant collector bracket.

14. An internal combustion engine system, comprising:

a cylinder block;

a cylinder head vertically attached to the cylinder block, the cylinder head including a plurality of coolant passages;

an exhaust gas recirculation (EGR) cooler including a plurality of mounting posts; and a coolant collector bracket coupled to and fluidly connecting the cylinder head and the EGR cooler, the coolant collector bracket including, a first internal channel for receiving coolant from a plurality of outlets of the plurality of coolant passages of the cylinder head; and a second internal channel for communicating the coolant to the cylinder block, the second internal channel being separate from the first internal channel, and wherein the coolant collector bracket is connected to the EGR cooler via the plurality of mounting posts of the EGR cooler.

15. The internal combustion engine system of claim 14, wherein the EGR cooler is in fluid communication with the first internal channel and the second internal channel of the coolant collector bracket.

16. The internal combustion engine system of claim 14, wherein the coolant collector bracket defines a longitudinal axis that extends approximately parallel to, and below, the EGR cooler.

17. The internal combustion engine system of claim 14, wherein the coolant collector bracket has a generally parallel and vertical mounting interface with the cylinder head.

18. The internal combustion engine system of claim 14, wherein the coolant collector bracket further includes a plurality of fastener connectors aligned with and supporting the plurality of mounting posts of the EGR cooler.

* * * * *